United States Patent

[11] 3,627,092

| [72] | Inventors | Fred J. Fleischauer<br>Oakmont, Pa.;<br>Theodore Hammond, Grand Haven, Mich. |
|---|---|---|
| [21] | Appl. No. | 842,044 |
| [22] | Filed | May 5, 1969 |
| [45] | Patented | Dec. 14, 1971 |
| [73] | Assignees | General Logistics Corporation<br>Oakmont, Pa.<br>by said Fleischauer;<br>Ermanco Incorporated<br>Grand Haven, Mich., by said Hammond,<br>part interest to each |

[54] BRAKE FOR GRAVITY ROLLER CONVEYORS
5 Claims, 6 Drawing Figs.

[52] U.S. Cl. ........................................................ 193/35 A,
198/127 R
[51] Int. Cl. ...................................................... B65g 13/00,
B65g 13/071, B65g 13/075
[50] Field of Search............................................ 193/35 A,
35-37; 198/40, 160, 161, 127

[56] References Cited
UNITED STATES PATENTS

| 1,406,709 | 2/1922 | Wilson .......................... | 193/35 A |
| 1,425,599 | 8/1922 | Lister ........................... | 193/35 A |
| 3,251,452 | 5/1966 | Conway et al. ............... | 198/40 X |

FOREIGN PATENTS

| 533,372 | 11/1956 | Canada ......................... | 193/35 A |
| 101,349 | 3/1965 | Denmark...................... | 193/35 A |
| 32,217 | 4/1931 | Netherlands ................. | 193/35 A |

*Primary Examiner*—Evon C. Blunk
*Assistant Examiner*—W. Scott Carson
*Attorney*—Wolfe, Hubbard, Leydig, Voit & Osann ABSTRACT: A brake for an accumulation gravity roller conveyor is disclosed in which a flexible band is disposed against certain individually rotatable conveyor rollers to apply a self-energizing frictional braking force upon being tensioned by a downstream triggering device.

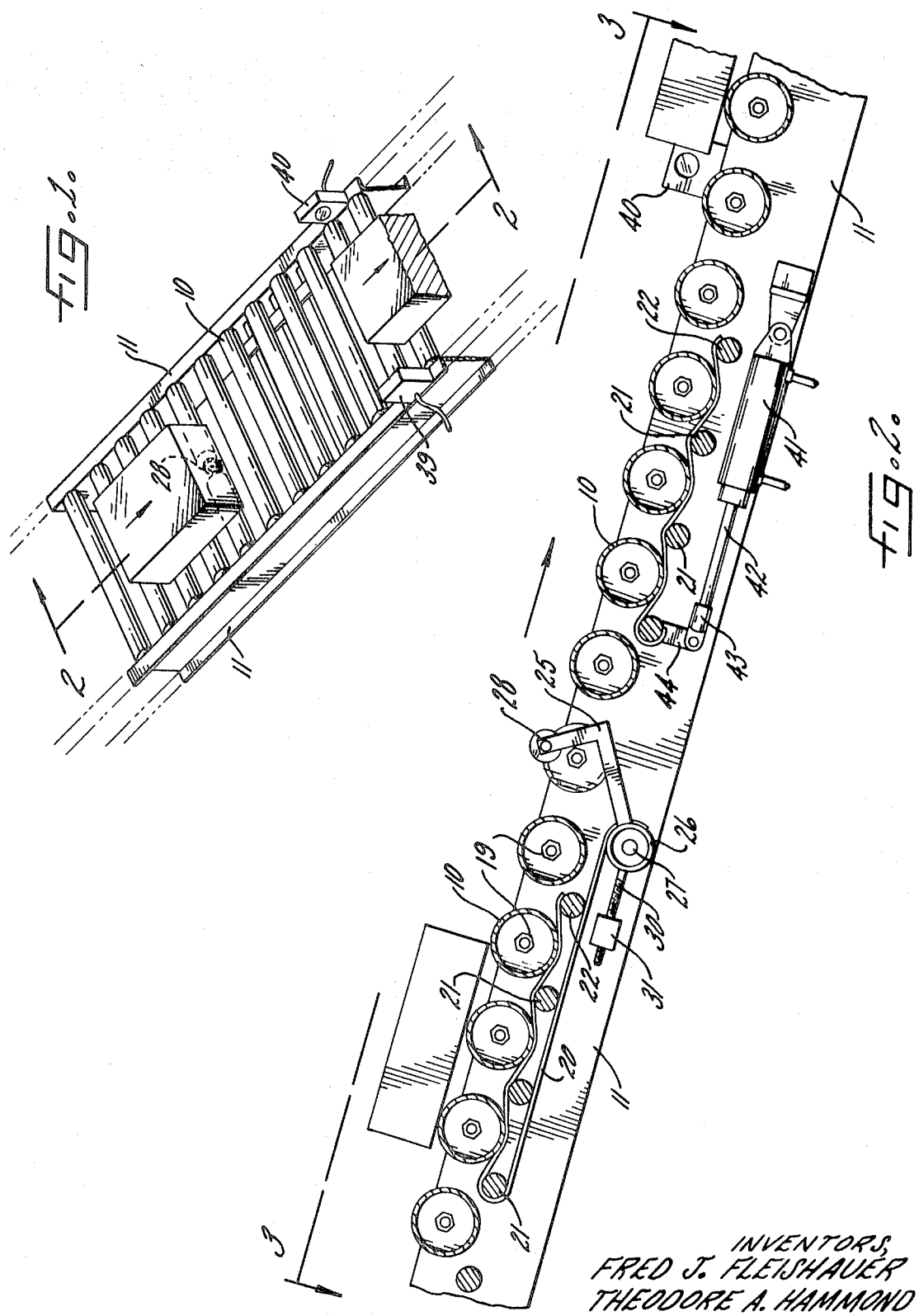

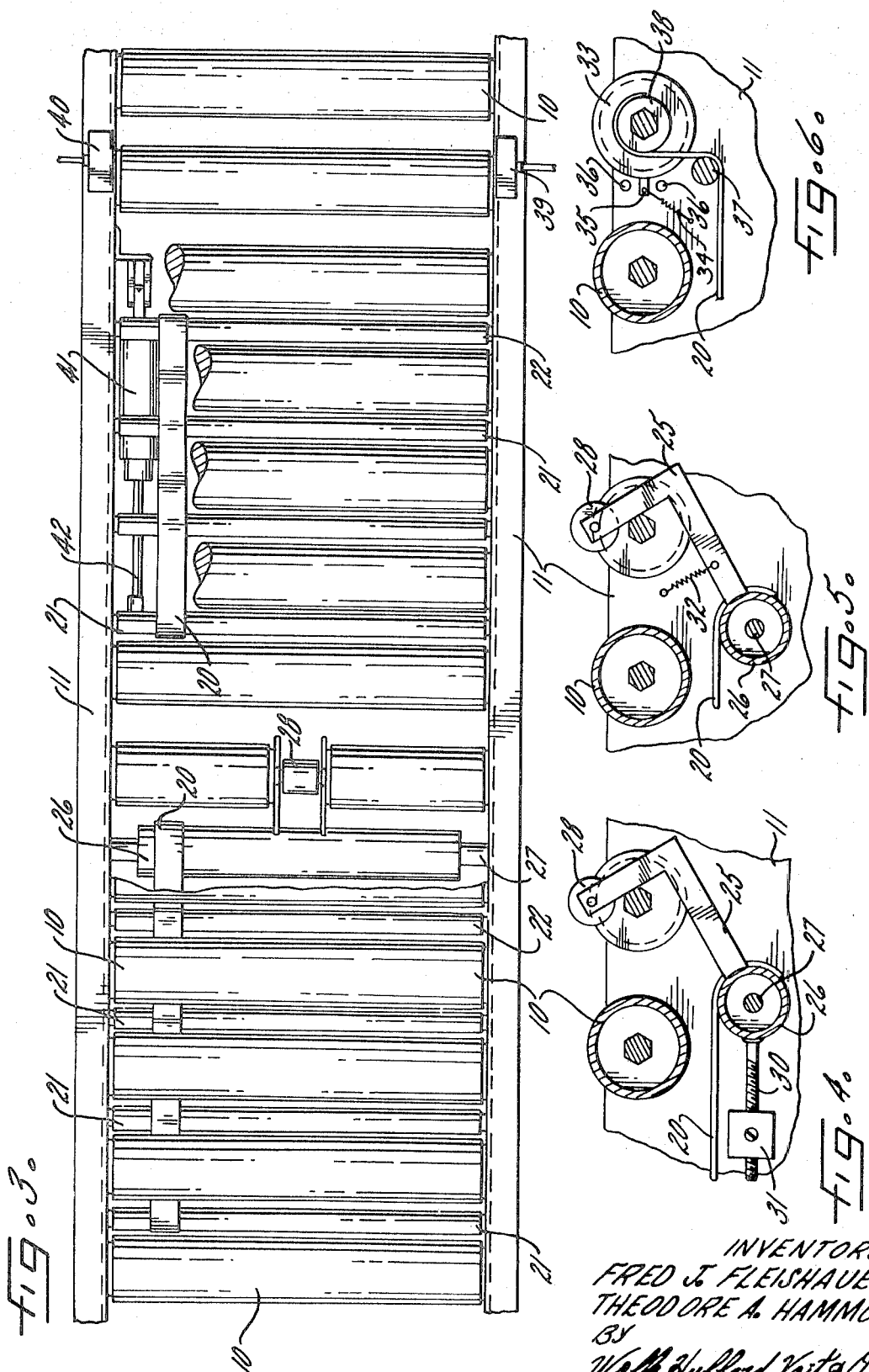

BRAKE FOR GRAVITY ROLLER CONVEYORS

DESCRIPTION OF THE INVENTION

This invention relates to conveyors, and in particular to roller conveyors disposed at an angle to the horizontal so as to be gravity powered. In its principal aspect the invention concerns a self-energizing brake for an accumulation gravity roller conveyor which is effective to prevent jamming, pressure buildup and overrun of conveyed objects.

A principal object of the present invention is to provide a braking system for gravity roller conveyors which is effective to slow or stop the movement of individual conveyed objects to prevent them from running together and jamming, or from building up a potentially damaging accumulation of forward pressure against a stoppage. It is intended in particular to provide a braking means for such conveyors which will accumulate the conveyed objects at predetermined spaced intervals upstream of a stoppage.

A related object to the above is to provide a conveyor braking means for the foregoing purposes which is self-energizing, that is, an increased deceleration load on the mechanism will impart a correspondingly increased frictional braking force, with the kinetic energy of the braked object being transformed into increased braking effect.

Other objects and advantages of the invention will become apparent from reading the following detailed description in conjunction with the drawings, in which:

FIG. 1 shows in perspective a portion of a gravity accumulation conveyor exemplifying the present invention;

FIG. 2 is a side elevation in section of the accumulation conveyor of FIG. 1 showing objects being conveyed along a pass line, and further showing two different embodiments of the trigger means used to tension the band brake;

FIG. 3 is a plan view of the structure shown in FIG. 2;

FIG. 4 is a detailed side elevation of the trigger roller apparatus of FIG. 2;

FIG. 5 is a first alternative construction of the trigger roller apparatus; and

FIG. 6 is a second alternative trigger roller apparatus.

While the invention is described in connection with certain illustrative preferred embodiments, it will be understood that the invention is not restricted to the particular uses and applications shown and described herein, but on the contrary may be utilized in all accumulation gravity conveyor applications where an accurately controlled and proportioned braking effect is required to assure proper operation.

Turning now to the drawings, there is shown in FIG. 1 an exemplary gravity accumulation conveyor in which individual rotatable transverse rollers 10 are supported by longitudinal side members 11 for rotation. The upper surfaces of the individual rollers 10 are disposed on a common plane inclined to the horizontal and define a pass line along which conveyed objects travel.

The rollers 10 are of conventional construction, being supported by ball bearings (not shown) on cross-shafts 19 carried by the side members 11.

Pursuant to the invention, means are provided to arrest or brake certain rollers or groups of rollers along the path of conveyor movement in response to a triggering signal which indicates a conveyor stoppage. Conveyed objects cannot then pass the arrested group of rollers and are therefore prevented from catching up with objects ahead of them causing a further jam or pressure buildup. When the stoppage is removed, the objects continue forward as before at predetermined spaced intervals. To accomplish this objective, an elongated flexible brake member or band 20 is disposed adjacent certain associated groups of rollers 10 in a manner which will arrest the movement of these rollers when tension is applied to one end of the band. The band 20 is positioned adjacent the periphery of each associated roller 10 apart from the pass line by a pair of support pegs 21 on each side of the roller 10. At one end, the band is anchored to an anchor peg 22. From the anchor peg 22 the band is disposed in serpentine fashion between the rollers 10 and the support pegs 21 so that when tensioned, the band 20 will wrap against the periphery of each roller 10 at a predetermined angle of band wrap, as best shown in FIG. 2. The opposite end of the band 20 is looped around the support peg 21 in the group most upstream with respect to conveyor movement, from which it is extended to a tensioning means, of which two basic types are shown in FIG. 2.

It is a feature of the invention that the band 20 is disposed in a manner which provides a self-energizing effect when it is tensioned. It will be observed in FIG. 2 that the anchor peg 22 in each case is positioned to resist the frictional force induced in the band by the rotation of the rollers 10 when rotating in the direction of movement induced by the passage of a conveyed object down the slope of the conveyor. The braking force generated by the first roller upstream of the anchor peg 22 tends to pull the band 20 away from the anchor peg, and the next roller 10 upstream adds to this frictional force and tends to more tightly draw the band 20 against the preceding roller. This effect is additive as more rollers are added to the group associated with a single band 20. The braking force applied to each roller 10 thus increases in a downstream direction in the particular group of rollers with which it is associated, with the roller 10 closest to the anchor peg 22 receiving the greatest amount of frictional braking effect.

Since the rollers 10 are each individually free to rotate in a normal direction of forward rotation induced by the passage of a conveyed object down the conveyor in a declining direction, it can be seen that upon the application of braking force to tension the band 20 in a given group of rollers 10, the rollers will be slowed or stopped, particularly those closest to the anchor peg 22. If the tensioning force is sufficient the rollers will tend to arrest the travel of any conveyed object entering upon them. In addition, the small friction force of the band 20 when relaxed will rapidly bring to a stop any rollers 10 which are still rotating after a conveyed object has passed by.

As provided for by the invention, the tensioning means for each band 20 can be actuated by the presence of a conveyed object at a predetermined trigger position on the pass line downstream of the roller or rollers to be braked. One type of means for applying tension to the band 20 is shown in the left-hand portion of FIG. 2 in which a trigger lever 25 is carried on a rotatable sleeve 26 mounted on a trigger pivot 27 carried by the side channel members 11 of the conveyor. The band 20 is affixed to the surface of the trigger sleeve 26 so that when the latter is rotated the band 20 is drawn around the sleeve 26 and thereby tensioned. At the upper end of the trigger lever 25 is a trigger roller 28 which protrudes above the pass line into the path of conveyed objects. It will be noticed that the trigger roller 28 is disposed slightly downstream of the centerline of the trigger pivot 27 so that the lever 25 is swingable in a downward direction when the trigger roller 28 encounters a conveyed object. At the other side of the trigger sleeve 26 is a counterweight shaft 30 and an adjustable counterweight 31 which allows the idling or no-load tension on the band 20 to be selectively adjusted so that the rollers 10 associated with the band are allowed to rotate freely until a conveyed object rides over the trigger roller 28 and tensions the band.

Alternative embodiments of this basic type of tensioning device are shown in FIGS. 4–6. In FIG. 5, there is shown a first alternative embodiment, differing in that a return spring 32 is provided in place of the counterweight shaft 30 and adjustable counterweight 31. The spring 32 is preferably made adjustable.

In FIG. 6 another alternative embodiment is shown in which the trigger lever 25 and a small trigger roller 28 are replaced by a larger trigger roller 33 of generally the same diameter as the powered rollers 10. The trigger roller 33 is biased by a spring 34 free to rotate within narrow angular limits as determined by a protruding dog 35 which is free to swing within an arc determined by a pair of limit pins 36. Other equivalent means of limiting freedom of rotation of the trigger roller 33 may be employed without departing from the invention. The brake band 20 runs from a positioning peg 37 to the periphery of a reduced diameter shaft segment 38 extending from the trigger roller 33. The band 20 is affixed to the shaft segment 38 in the same manner as the corresponding band 20 on the trigger sleeve 26 in the embodiment of FIG. 4. The periphery of the trigger roller 33 at the pass line is provided with a surface which produces a controlled degree of friction so that the passage of a conveyed object over the trigger roller 33 will tend to rotate it in a manner applying the requisite tension to the band brake 20. If desired, the periphery of the trigger roller 33 may be disposed somewhat above the pass line to assure proper frictional contact with a conveyed object, such as by making the diameter of trigger roller 33 slightly larger than the conveyor rollers 10. The trigger roller 33 may also be connected to the shaft segment by a slip clutch to permit the roller 33 to rotate under the conveyed objects and limiting the tension applied to the band 20.

Another basic type of tensioning device is shown in the right-hand portion of FIG. 2. In this embodiment, the triggering is accomplished by means of a light source 39 and an electric eye 40 located downstream of the associated rollers 10, and the tensioning force is supplied by a pneumatic power cylinder 41. The cylinder 41 is pivoted at one end to the frame side rail 11, and at the other carries an extensible shaft 42 terminating in a clevis 43 which attaches to a brake lever 44 pivotally mounted on the adjacent side rail 11. The brake lever 44 in this embodiment takes the place of one of the support pegs 21, and the brake band 20 is fixed to its rounded surface so that movement of the brake lever 44 affects tensioning of the band 20.

In all of the embodiments discussed, if the trigger means is not disposed somewhat downstream of the group of rollers 10 which it controls, there is the possibility that a conveyed object may tend to stop itself by actuating a trigger means which brakes one or more rollers on which the object is then being carried. To eliminate this problem, each trigger means is preferably disposed at an interval whereby the group of rollers 10 which it controls are spaced upstream by a distance at least as large as the length of the conveyed object in the direction of conveyor travel. Alternatively, each trigger means may be disposed at staggered intervals whereby a group of rollers 10 is controlled by the second succeeding downstream trigger means rather than by the first succeeding trigger means immediately downstream. Such a construction is shown in our copending patent application Ser. No. 793,666 for SELF-ENERGIZING BRAKE FOR ROLLER CONVEYORS, in which the brake bands of each succeeding group of rollers are disposed in staggered fashion, overlapping one another so that a given trigger means controls a group of rollers spaced two intervals upstream of itself.

The following is claimed as invention:

1. In a conveyor having a plurality of spaced individually rotatable rollers defining a pass line tangent to the upper surfaces of said rollers and at a declining angle to the horizontal for transporting objects in the declining direction of conveyor movement by gravitational forces, a brake comprising in combination a flexible band disposed adjacent the periphery of certain of said rollers apart from the pass line, band positioning means for supporting the band adjacent said certain rollers, said certain rollers being rotatable in their normal forward direction by the passage of an object over said rollers, and trigger means positioned to be actuated by the presence of a conveyed object at a predetermined position on said pass line downstream of said certain rollers for automatically tensioning said band to apply a frictional braking force to said certain rollers.

2. Apparatus as defined in claim 1 in which said tensioning means includes a trigger lever and actuating means protruding above the pass line into the path of conveyed objects, said lever being swingable in a downward direction upon being encountered by a conveyed object to create a tension force in said band.

3. Apparatus as defined in claim 1 in which said tensioning means includes a trigger roller substantially tangent to the pass line and having a friction-producing surface, and linkage means for translating rotation of said trigger roller into tensioning movement of said band.

4. Apparatus as defined in claim 1 in which said tensioning means includes an electric eye positioned adjacent said pass line downstream of said certain roller, and power tensioning means responsive to the detection of a conveyed object by said electric eye for applying a tensioning force to said band.

5. In a conveyor comprising a sides of spaced individually rotatable rollers defining a pass line extending along the length of said conveyor and at a declining angle to the horizontal over which objects are transported in the declining direction under gravitational forces, said rollers being rotatable in their normal forward direction by the passage of one article over said rollers, a brake including an elongated flexible band disposed adjacent the underside of certain of said rollers, flexible band supports disposed on opposite sides of each of said certain rollers to be braked and having an upper extremity below said pass line and above the lower extremity of said certain rollers, said flexible band being disposed between said supports and said certain rollers to be braked and positioned against the underside of rollers securing the said certain rollers at a predetermined angle of wrap at the periphery of each of said certain rollers, trigger means, said band being secured at one end to said trigger means, said trigger means being positioned to be actuated by the presence of a conveyed object at a predetermined position on said pass line downstream of said certain rollers for automatically tensioning said flexible band to apply a frictional braking force to said certain rollers, and anchor means located downstream of said certain rollers securing the opposite end of said band against movement relative to said rollers whereby said anchor means resists tension forces induced in said band by said trigger means, and whereby during the time said tensioning means is actuated to tension said flexible band further forward rotational movement of said certain roller causes additional tensioning of said flexible band and a self-energizing additional braking force to said certain rollers.

* * * * *

PO-1050
(5/69)

UNITED STATES PATENT OFFICE
CERTIFICATE OF CORRECTION

Patent No. 3,627,092      Dated December 14, 1971

Inventor(s) Fred J. Fleischauer and Theodore A. Hammond

It is certified that error appears in the above-identified patent and that said Letters Patent are hereby corrected as shown below:

Column 4, line 39, delete --rollers securing the-- and insert "each".

Signed and sealed this 11th day of July 1972.

(SEAL)
Attest:

EDWARD M. FLETCHER, JR.
Attesting Officer

ROBERT GOTTSCHALK
Commissioner of Patents